March 5, 1963  J. S. ZDANIS  3,080,092
MATERIAL FEED APPARATUS
Filed Nov. 4, 1958  2 Sheets-Sheet 1
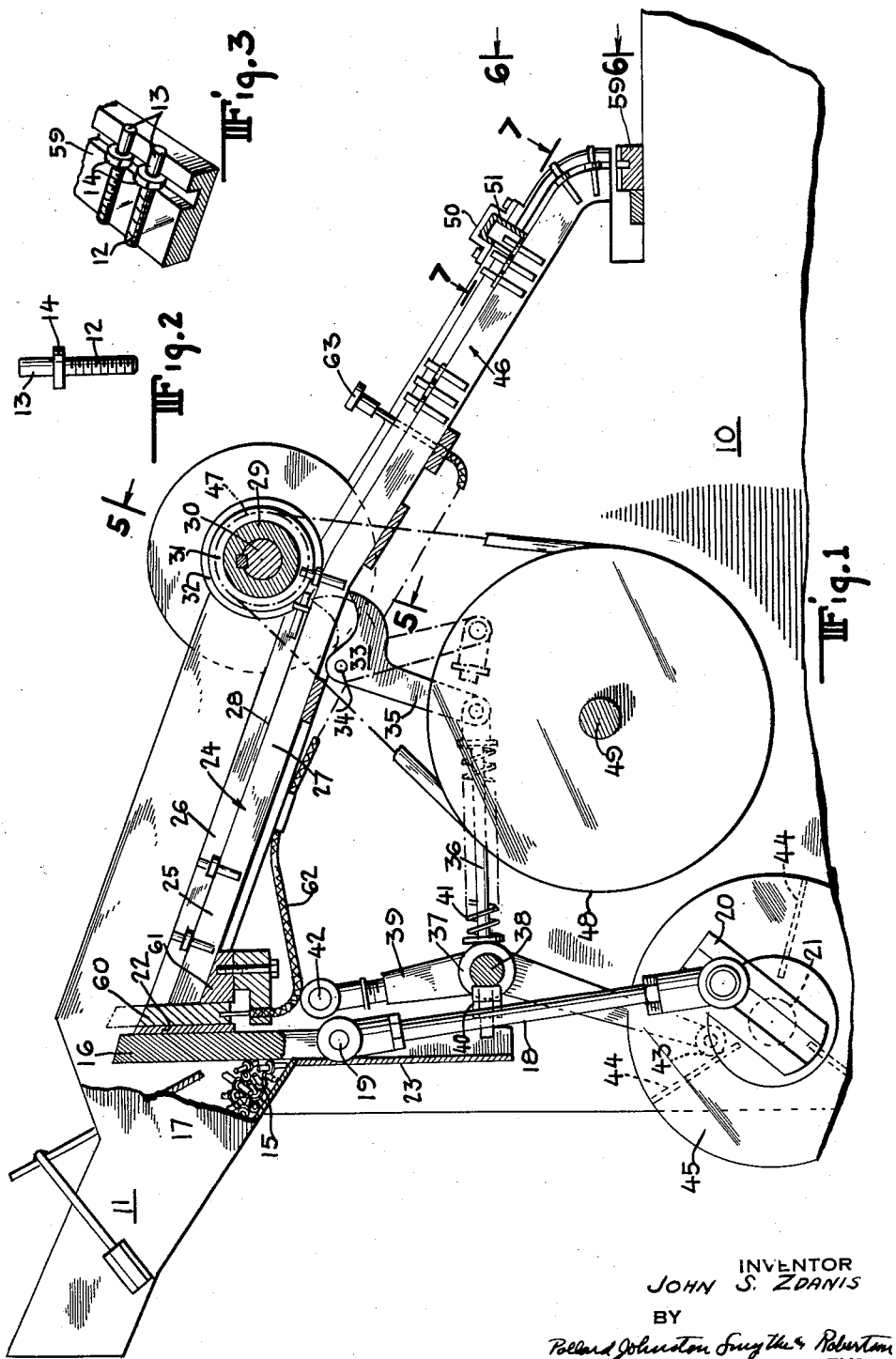
INVENTOR
JOHN S. ZDANIS
BY
Pollard Johnston Smythe & Robertson
ATTORNEYS

INVENTOR
JOHN S. ZDANIS
BY
ATTORNEYS

3,080,092
MATERIAL FEED APPARATUS
John S. Zdanis, Watertown, Conn., assignor to The Siemon Company, Watertown, Conn., a corporation of Connecticut
Filed Nov. 4, 1958, Ser. No. 771,873
9 Claims. (Cl. 221—68)

The present invention relates to the art of assembling small articles into an orderly arrangement, and particularly to a new and improved apparatus for automatically assembling terminal screws for electrical panels preparatory to molding them into a terminal board of plastic material or the like.

The principal object of the invention is to provide an apparatus capable of depositing within a mold a predetermined number of properly arranged terminal screws.

Another object of this invention is to provide such a machine which will continuously feed terminal screws to a discharging gate so that an uninterrupted supply will be available for molds that are placed beneath the discharging gate.

Another object of the invention is to provide such a machine in which a grooved roll is adapted to intercept improperly arranged terminal screws.

Another object of the invention is to provide such a machine in which intermittently operable means is employed to remove improperly arranged screws that have been intercepted by the grooved wheel.

Another object of the invention is to provide such a machine in which a plurality of columns of terminal screws are arranged, and in which means is provided for discharging only one terminal screw at a time from each of said columns.

Another object of the invention is to provide such a machine in which the flow of terminal screws to a given column can be interrupted at the will of the operator.

One aspect of the invention may be to provide a hopper for holding a quantity of terminal screws which may be of cylindrical form having a threaded and plain portion separated by a locating collar, and in which the threaded portion may be longer than the plain portion.

An inclined grooved plate may lead from the hopper to a roller means having grooves that may be aligned with those of the inclined plate. The construction may be such that terminal screws discharged from the hopper may tumble down the inclined plate, many of which will, by virtue of the threaded portion being longer than the plain portion, repose within the grooves such that their threaded portions extend downwardly and their plain portions extend upwardly. Others may not become properly arranged within the grooves of the inclined plane and may tumble into engagement with the grooved roller.

In another aspect of the invention, each groove in the roller may be such that it will feed terminal screws, one at a time, to another grooved storage plate, provided the terminal screw arrives at the roller with its threaded portion extending downwardly and its plain portion extending upwardly. In any other condition, the roller will refuse to pass the screws.

In still another aspect of the invention, a picker means may be provided for each groove or for some of the grooves of the roller arranged so that said picker means will throw upwardly along the inclined plate any terminal screw that is not accepted or properly arranged to be accepted by the roller so that the rejected screw may tumble downwardly again and again until it is accepted by the roll.

In another aspect of the invention, means may be provided for interrupting the flow of screws to a particular groove in the inclined plate should such groove become full before adjacent grooves.

Still another aspect of the invention may be to provide a novel gate mechanism that is adapted to receive a properly arranged terminal screw from each groove of the storage plate and to release a set of such screws while retaining others that are in position to gravitate into the gate mechanism.

The above as well as other objects and novel features of the invention will become apparent from the following specification and accompanying drawings which are merely exemplary.

In the drawings:

FIG. 1 is a sectional elevational view of apparatus to which the principles of the invention have been applied;

FIG. 2 is a view of a terminal screw of the type employed with the apparatus of FIG. 1;

FIG. 3 is a perspective view of a portion of a mold in which two terminal screws are assembled prior to being molded into an integral unit;

Figure 4:
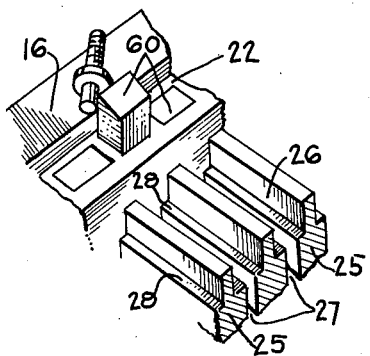
FIG. 4 is a perspective view of a portion of the apparatus of FIG. 1, showing a detail of the hopper discharging mechanism.

Referring to FIG. 1, the principles of the invention are shown as applied to an apparatus including a frame 10 to the one end of which a hopper 11 may be attached for holding a quantity of terminal screws or other elements. Referring to FIG. 2, the screws may include a threaded portion 12 and a plain cylindrical portion 13 which is shorter than the threaded portion and may be separated therefrom by a collar 14.

The forward end or discharging end 15 of the hopper 11 may be provided with an opening for receiving a vertically reciprocable discharging shoe or plate 16. A pivotally mounted plate 17 may extend into the hopper 11 and cooperate with the shoe 16 to limit the flow of terminal screws from the hopper to the top of the shoe 16 when the latter is at its lowest point in its reciprocative stroke.

The shoe 16 may be connected to a rod 18 by a wrist pin 19 and the opposite end of rod 18 may be connected to a crank 20 that is fixed to a shaft 21. The shoe 16 is guided in its reciprocation by the walls 22 and 23 and reciprocates in the manner of a cross head.

A conveyor plate 24 may be arranged along an inclined plane and may extend from the exit of the hopper 11. The plate 24 may include a plurality of parallel portions 25 (FIG. 4) of inverted T cross-section, forming sets of parallel aligned grooves 26 and 27 separated by surfaces 28. The construction and arrangement of the plate 24 are such that when the shoe reaches the top of its stroke, it forces a plurality of terminal screws over the top of the wall 22, causing them to tumble down the inclined plate 24. Because the screws have a longer threaded portion, they will tend to tumble into the grooves 26 so that the heavier threaded portion 12 extends into the groove 27 and the collar 14 rests on the surfaces 28 with the plain portion 13 extending upwardly in the groove 26.

Figure 5:
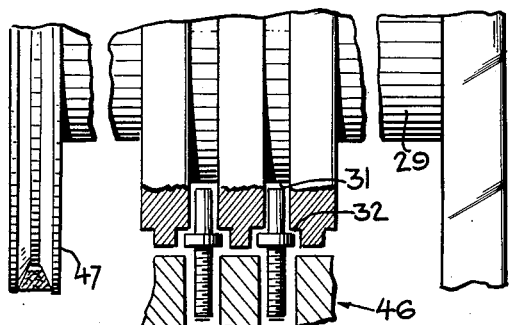
FIG. 5 is a sectional elevational view taken substantially along line 5—5 of FIG. 1.
Figure 6:
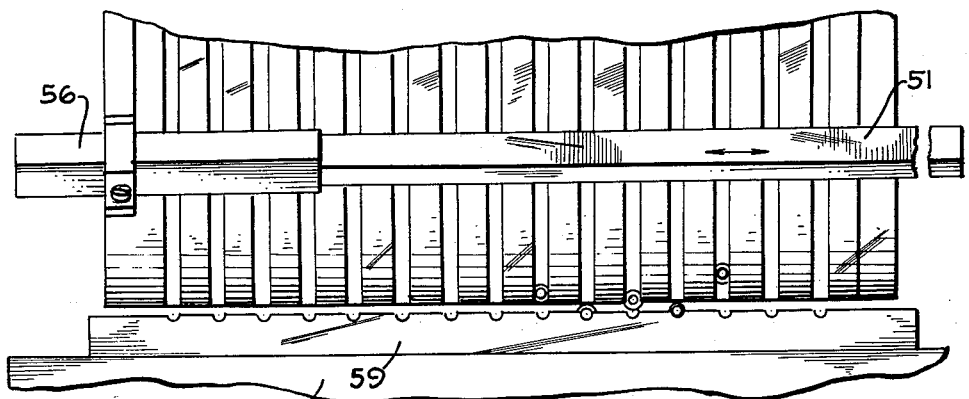
FIG. 6 is a plan view looking in the direction of the arrows along line 6—6 of FIG. 1.

At the lower end of the inclined plate 24, an intercepting and feeding roller 29 may be keyed to a shaft 30. The roller 29 may include a plurality of narrow and wide grooves 31 and 32 (FIG. 5) arranged to pass those screws that gravitate down the grooves 26 and 27 of plate 24 with their threaded ends extending downwardly into groove 27. Any of the screws which arrive at the roller 29 in any other position cannot be accommodated by the grooves 31 and 32.

In order to remove the improperly located screws that arrive at the roller 29, a separate picker blade 33 may be provided for each groove 27 in plate 24 and all of which blades may be fixed to a common pivot shaft 34. One of the blades 33 may include an arm 35 that may be connected to a bar or rod 36. The bar 36 may slidingly extend through a sleeve 37 journaled on a pin 38 integral with a lever 39. Nut means 40 may limit the movement of the bar 36 in one direction and a spring 41 acting between arm 35 and sleeve 37 may normally separate the lever 39 and the arm 35, providing therebetween a compressible connecting means. The spring 41 normally urges the lever 39 in a clockwise direction about a pivot 42. The free end of lever 39 may include a roller 43 for cooperation with radial blades 44 on a disc 45 mounted on shaft 21 for rotation therewith.

From the foregoing it is evident that rotary power supplied to shaft 21 will not only effect reciprocation of the shoe 16 but will also cause the blades 44 to move the lever 39 counterclockwise about its pivot 42 and cause picker blades 33 to forcibly discharge or pick all screws that are improperly arranged behind and adjacent the roller 29, causing such screws to be thrown upwardly on inclined plate 24 whereupon they will tumble downwardly again until they become properly arranged behind roller 29.

Extending downwardly from the roller 29 may be a storage plate 46 similar to plate 24 and provided with a like number of grooves similar to the grooves 26, 27 and which may be aligned with the grooves 31 and 32 of the roller 29.

The roller 29 may be provided with a pulley 47 that may be belted to another pulley 48 that is fixed to a shaft 49. Power from shaft 21 may be transferred to shaft 49 by any means so that roller 29 is rotated in phase with the reciprocation of shoe 16. Rotation of roller 29 causes the terminal screws to be fed in proper arrangement to the grooves in the storage plate 46.

Figure 7:
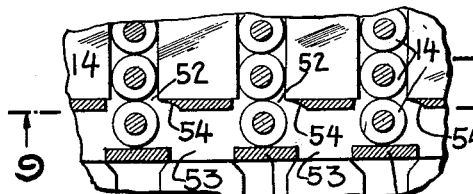
FIG. 7 is a partial, sectional elevational view taken substantially along line 7—7 of FIG. 6.
Figure 8:
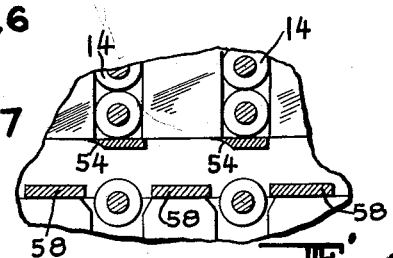
FIG. 8 is a view similar to that shown in FIG. 7 but with the parts in different relative positions.
Figure 9:
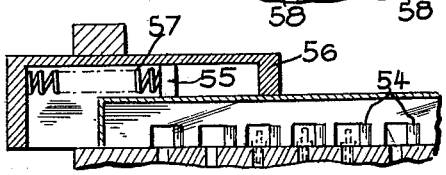
FIG. 9 is a sectional view taken substantially along line 9—9 of FIG. 7.

The storage plate 46 may be provided with a gate 50 for receiving and discharging simultaneously one terminal screw from each groove. Referring to FIGS. 1, 8 and 9, the gate 50 may include a reciprocable channel-shaped member 51 having staggered openings 52 and 53 (FIG. 7) in the parallel walls thereof. The leading edges 54 of the channel walls forming the openings 52 may be feathered so that they will readily pass between abutting collars 14 of adjacent terminal screws within the grooves of plate 46.

The channel-shaped member 51 may include an ear 55 that extends into a stationary housing 56, within which a spring 57 is located. The spring 57 normally urges the channel-shaped member 51 to a position in its reciprocative path of motion such that the openings 52 permit a terminal screw to move into abutting relation with the portions 58 of the wall of channel member 51 that forms the openings 53. Movement of the channel member 51 against the action of the spring 57 by pressure to the left in FIG. 9 on the right hand end of member 51 causes the feathered edges 54 to separate and force upwardly or to hold the terminal screws in each groove of plate 46 except the ones within the channel-shaped member 51. Continued movement of member 51 causes the openings 52 to be closed and the openings 53 to become aligned with the terminal screws within the member 51. Accordingly, those terminal screws within member 51 gravitate along the grooves of plate 46 to a point vertically above a portion 59 of a mold or receptacle that may be located by any manual or automatic means for receiving a set of screws as it is discharged from the gate 50.

During the operation of the apparatus, certain of the grooves within the storage plate 46 may become filled before others, or it may be that the molds 59 require less than the number of screws that can be handled by the gate 50. In order to control the flow of screws to the grooves 26 of plate 24, an interceptor 60 (FIGS. 1 and 4) may be provided for each groove 26 within plate 24. The interceptors 60 may be mounted within a bracket 61 adjacent the shoe 16, and each may be connected to a "Bowden" wire 62 that leads to a convenient location where a stop 63 may be provided for actuating the "Bowden" wire 62.

There may be a stop 63, "Bowden" wire 62 and an interceptor 60 for each groove 26 in plate 24, and it is only necessary for an operator to actuate any of the stops 63 to control the flow of terminal screws to the gate 50.

Although the various features of the assembling machine have been shown and described in detail to fully disclose one embodiment of the invention, it will be evident that numerous changes may be made in such details and certain features may be used without others without departing from the principles of the invention.

What is claimed is:

1. In an apparatus for assembling small parts into an orderly arrangement, including means for feeding a quantity of said parts to a hopper; the combination including an inclined conveying member leading from said hopper having a plurality of spaced parallel part-conveying grooves; means for randomly discharging a number of said parts onto said conveying member; means on said conveying member for causing at least some of said parts to gravitate into a position such that their longitudinal axes are transverse to said conveying member; a storage member having a plurality of spaced parallel part-storing grooves aligned with said part-conveying grooves; means for passing said transversely arranged parts to said storage member and for intercepting mis-arranged parts; means for causing said mis-arranged parts to be returned to a point on said conveying member without leaving said conveying member where they repeatedly gravitate along said conveying member until they become properly arranged with their longitudinal axes transverse of said conveying member; and movable gate means associated with said storage member; separate, manually operable interceptor means for controlling the flow of parts to each of said part-conveying grooves; for causing the discharge from said storage member of quantities of said parts as controlled by said interceptor means when said gate means is moved.

2. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; surfaces between said parallel grooves on said conveying member for causing at least some of said parts to gravitate into a position such that their longitudinal axes are transverse to said conveying member; a storage member having a plurality of spaced parallel part-storing grooves aligned with said part-conveying grooves; means for passing said transversely arranged parts to said storage member and for intercepting mis-arranged parts; means for causing said mis-arranged parts to be returned to a point on said conveying member without leaving said conveying member where they repeatedly gravitate along said conveying member until they become properly arranged with their longitudinal axes transverse of said conveying member; and movable gate means associated with said storage member; separate, manually operable interceptor means for controlling the flow of parts to each of said part-conveying grooves; for causing the discharge from said storage member of quantities of said parts as controlled by said interceptor means as controlled by said interceptor means when said gate means is moved.

3. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; surfaces between said parallel grooves on said conveying member for causing at least some of said parts to gravitate into a position such that their longitudinal axes are transverse to said conveying member; a storage member having a plurality of spaced parallel part-storing grooves aligned with said part-conveying grooves; rotatable drum means having grooves aligned with the grooves of said conveying member for passing said transversely arranged parts to said storage member and for intercepting mis-arranged parts; means for causing said mis-arranged parts to be returned to a point on said conveying member without leaving said conveying member where they repeatedly gravitate along said conveying member until they become properly arranged with their longitudinal axes transverse of said conveying member; and movable gate means associated with said storage member; separate, manually operable interceptor means for controlling the flow of parts to each of said part-conveying grooves; for causing the discharge from said storage member of quantities of said parts as controlled by said interceptor means as controlled by said interceptor means when said gate means is moved.

4. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; surfaces between said parallel grooves on said conveying member for causing at least some of said parts to gravitate into a position such that their longitudinal axes are transverse to said conveying member; a storage member having a plurality of spaced parallel part-storing grooves aligned with said part-conveying grooves; rotatable drum means having grooves aligned with the grooves of said conveying member for passing said transversely arranged parts to said storage member and for intercepting mis-arranged parts; separate pivotally mounted means for each groove of said conveying member for causing said mis-arranged parts to be returned to a point on said conveying member without leaving said conveying member where they repeatedly gravitate along said conveying member until they become properly arranged with their longitudinal axes transverse of said conveying member; and movable gate means associated with said storage member; separate, manually operable interceptor means for controlling the flow of parts to each of said part-conveying grooves; for causing the discharge from said storage member of quantities of said parts as controlled by said interceptor means as controlled by said interceptor means when said gate means is moved.

5. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; means on said conveying member for causing at least some of said parts to gravitate into a position such that their longitudinal axes are transverse to said conveying member; a storage member having a plurality of spaced parallel part-storing grooves aligned with said part-conveying grooves; means for passing said transversely arranged parts to said storage member and for intercepting mis-arranged parts; means for causing said mis-arranged parts to be returned to a point on said conveying member without leaving said conveying member where they repeatedly gravitate along said conveying member until they become properly arranged with their longitudinal axes transverse of said conveying member; and a reciprocable gate normally urged to a position for receiving said arranged parts from said storage member and for preventing their discharge therefrom; separate, manually operable interceptor means for controlling the flow of parts to each of said part-conveying grooves; said gate being reciprocable to a position where the supply of said parts to said gate is interrupted, and those within said gate released to effect their discharge from said gate.

6. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; means on said conveying member for causing at least some of said parts to gravitate into a position such that their longitudinal axes are transverse to said conveying member; a storage member having a plurality of spaced parallel part-storing grooves aligned with said part-conveying grooves; means for passing said transversely arranged parts to said storage member and for intercepting mis-arranged parts; means for causing said mis-arranged parts to be returned to a point on said conveying member without leaving said conveying member where they repeatedly gravitate along said conveying member until they become properly arranged with their longitudinal axes transverse of said conveying member; and a reciprocable gate normally urged to a position for receiving said arranged parts from said storage member and for preventing their discharge therefrom; said gate being reciprocable to a position where the supply of said parts to said gate is interrupted, and those within said gate released to effect their discharge from said gate; and interceptor means for controlling the effectiveness of said random discharging means.

7. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; surfaces between said parallel grooves on said conveying member for causing at least some of said parts to gravitate into a position such that their longitudinal axes are transverse to said conveying member; a storage member; rotatable drum means having grooves aligned with the grooves of said conveying member for passing said transversely arranged parts to said storage member and for intercepting mis-arranged parts; spaced parallel grooves in said storage member corresponding to the grooves in said drum means and said conveying member; means for causing said mis-arranged parts to be returned to a point on said conveying member without leaving said conveying member where they repeatedly gravitate along said conveying member until they become properly arranged with their longitudinal axes transverse of said conveying member; gate means associated with said storage member; said gate means being reciprocable to for causing the discharge from said storage member of controlled quantities of said parts; and separate means for each of said part-conveying grooves for controlling the effectiveness of said random discharging means.

8. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; surfaces between said parallel grooves on said conveying member for causing at least some of said parts to gravitate into a position such that their longitudinal axes are transverse to said conveying member; a storage member; rotatable drum means having grooves aligned with the grooves of said conveying member for passing said transversely arranged parts to said storage member and for intercepting mis-arranged parts; spaced parallel grooves in said storage member corresponding to the grooves in said drum means and said conveying member; means for causing said mis-arranged parts to be returned to a point on said conveying member without leaving said conveying member where they repeatedly gravitate along said conveying member until they become properly arranged with their longitudinal axes transverse of said conveying member; a channel member mounted for reciprocative movement on said storage member, said channel member having staggered openings in the parallel walls thereof; and means normally urging said channel member to a position where the openings in one wall thereof are aligned with the grooves in said storage member and the openings in the other wall thereof are mis-aligned with said grooves.

9. In an apparatus for assembling small parts into an orderly arrangement, a hopper adapted to contain a quantity of said parts; an inclined conveying member leading from said hopper having a plurality of spaced parallel part-conveying grooves; means for randomly discharging a number of said parts onto said conveying member; surfaces between said parallel grooves on said conveying member for causing at least some of said parts to gravitate into a position such that their longitudinal axes are transverse to said conveying member; a storage member; rotatable drum means having grooves aligned with the grooves of said conveying member for passing said transversely arranged parts to said storage member and for intercepting mis-arranged parts; spaced parallel grooves in said storage member corresponding to the grooves in said drum means and said conveying member; means for causing said mis-arranged parts to be returned to a point on said conveying member without leaving said conveying member where they repeatedly gravitate along said conveying member until they become properly arranged with their longitudinal axes transverse of said conveying member; a channel member mounted for reciprocative movement on said storage member, said channel member having staggered openings in the parallel walls thereof; means normally urging said channel member to a position where the openings in one wall thereof are aligned with the grooves in said storage member and the openings in the other wall thereof are mis-aligned with said grooves; and separate means for each of said part-conveying grooves for selectively controlling said random discharging means.

References Cited in the file of this patent

UNITED STATES PATENTS

| Number | Name | Date |
|---|---|---|
| 326,246 | Richards | Sept. 15, 1885 |
| 432,477 | Casey | July 15, 1890 |
| 488,084 | Miner | Dec. 13, 1892 |
| 913,151 | Neher | Feb. 23, 1909 |
| 959,454 | Campbell | May 31, 1910 |
| 1,325,752 | Pope | Dec. 23, 1919 |
| 1,336,785 | Matter et al. | Apr. 13, 1920 |
| 1,888,520 | Twomley | Nov. 22, 1932 |
| 1,921,485 | Seger | Aug. 8, 1933 |
| 1,944,360 | Meyer | Jan. 23, 1934 |
| 2,546,866 | Overly | Mar. 27, 1951 |
| 2,615,556 | Hoopes et al. | Oct. 28, 1952 |
| 2,628,874 | Everhart | Feb. 17, 1953 |
| 2,781,885 | Taylor | Feb. 19, 1957 |

UNITED STATES PATENT OFFICE
CERTIFICATE OF CORRECTION

Patent No. 3,080,092                         March 5, 1963

John S. Zdanis

It is hereby certified that error appears in the above numbered patent requiring correction and that the said Letters Patent should read as corrected below.

Column 2, line 43, for "reeciving" read -- receiving --; column 5, lines 2 and 59, strike out "as controlled by said interceptor means", each occurrence.

Signed and sealed this 3rd day of December 1963.

SEAL)
ttest:
RNEST W. SWIDER

.testing Officer

EDWIN L. REYNOLDS

Acting Commissioner of Patents